(12) United States Patent
Seeger et al.

(10) Patent No.: US 8,534,127 B2
(45) Date of Patent: Sep. 17, 2013

(54) EXTENSION-MODE ANGULAR VELOCITY SENSOR

(75) Inventors: Joseph Seeger, Menlo Park, CA (US); Bruno Borovic, San Francisco, CA (US)

(73) Assignee: Invensense, Inc., San Jose, CA (US)

( * ) Notice: Subject to any disclaimer, the term of this patent is extended or adjusted under 35 U.S.C. 154(b) by 1027 days.

(21) Appl. No.: 12/558,398

(22) Filed: Sep. 11, 2009

(65) Prior Publication Data

US 2011/0061460 A1    Mar. 17, 2011

(51) Int. Cl.
*G01C 19/00* (2013.01)

(52) U.S. Cl.
USPC ..................... 73/504.12; 73/514.32

(58) Field of Classification Search
USPC .............. 73/504.12, 503.3, 504.02, 514.02, 73/514.32
See application file for complete search history.

(56) References Cited

U.S. PATENT DOCUMENTS

| | | |
|---|---|---|
| 4,511,848 A | 4/1985 | Watson |
| 4,736,629 A | 4/1988 | Cole |
| 5,083,466 A | 1/1992 | Holm-Kennedy et al. |
| 5,359,893 A | 11/1994 | Dunn |
| 5,367,194 A | 11/1994 | Beatty |
| 5,481,914 A | 1/1996 | Ward |
| 5,635,638 A | 6/1997 | Geen |
| 5,656,778 A | 8/1997 | Roszhart |
| 5,659,195 A | 8/1997 | Kaiser et al. |
| 5,703,292 A | 12/1997 | Ward |
| 5,703,293 A | 12/1997 | Zabler et al. |
| 5,780,740 A | 7/1998 | Lee et al. |
| 5,895,850 A | 4/1999 | Buestgens |
| 5,915,168 A | 6/1999 | Salatino et al. |
| 5,992,233 A | 11/1999 | Clark |
| 5,996,409 A | 12/1999 | Funk et al. |
| 6,036,872 A | 3/2000 | Wood et al. |
| 6,067,858 A | 5/2000 | Clark et al. |
| 6,122,961 A | 9/2000 | Geen et al. |
| 6,134,961 A | 10/2000 | Touge et al. |
| 6,153,917 A | 11/2000 | Matsunaga et al. |
| 6,189,381 B1 | 2/2001 | Huang et al. |
| 6,229,190 B1 | 5/2001 | Bryzek et al. |
| 6,230,563 B1 | 5/2001 | Clark et al. |
| 6,230,564 B1 | 5/2001 | Matsunaga et al. |
| 6,250,156 B1 | 6/2001 | Seshia et al. |
| 6,250,157 B1 | 6/2001 | Touge |
| 6,370,937 B2 | 4/2002 | Hsu |

(Continued)

OTHER PUBLICATIONS

Yazdi, Navid et al., "Micromachined Interial Sensors," Proceedings of the IEEE, vol. 86, No. 8, Aug. 1998, pp. 1640-1659.

(Continued)

*Primary Examiner* — Peter Macchiarolo
*Assistant Examiner* — Samir M Shah
(74) *Attorney, Agent, or Firm* — Sawyer Law Group, P.C.

(57) ABSTRACT

An angular velocity sensor including a drive extension mode. In one aspect, an angular rate sensor includes a base and at least three masses disposed substantially in a plane parallel to the base, the masses having a center of mass. At least one actuator drives the masses in an extension mode, such that in the extension mode the masses move in the plane simultaneously away or simultaneously towards the center of mass. At least one transducer senses at least one Coriolis force resulting from motion of the masses and angular velocity about at least one input axis of the sensor. Additional embodiments can include a linkage that constrains the masses to move in the extension mode.

27 Claims, 17 Drawing Sheets

(56) References Cited

U.S. PATENT DOCUMENTS

| | | |
|---|---|---|
| 6,391,673 B1 | 5/2002 | Ha et al. |
| 6,405,592 B1 * | 6/2002 | Murari et al. ............... 73/493 |
| 6,426,687 B1 | 7/2002 | Osborn |
| 6,430,998 B2 | 8/2002 | Kawai et al. |
| 6,433,411 B1 | 8/2002 | Degani et al. |
| 6,445,195 B1 | 9/2002 | Ward |
| 6,448,109 B1 | 9/2002 | Karpman |
| 6,452,238 B1 | 9/2002 | Orcutt et al. |
| 6,479,320 B1 | 11/2002 | Gooch |
| 6,480,320 B2 | 11/2002 | Nasiri |
| 6,481,283 B1 | 11/2002 | Cardarelli |
| 6,481,284 B2 | 11/2002 | Geen et al. |
| 6,481,285 B1 | 11/2002 | Shkel et al. |
| 6,487,908 B2 | 12/2002 | Geen et al. |
| 6,494,096 B2 | 12/2002 | Sakai et al. |
| 6,508,122 B1 | 1/2003 | McCall et al. |
| 6,508,125 B2 | 1/2003 | Otani |
| 6,513,380 B2 | 2/2003 | Reeds, III et al. |
| 6,519,075 B2 | 2/2003 | Carr et al. |
| 6,520,017 B1 * | 2/2003 | Schoefthaler et al. ..... 73/514.02 |
| 6,528,344 B2 | 3/2003 | Kang |
| 6,533,947 B2 | 3/2003 | Nasiri et al. |
| 6,539,804 B1 | 4/2003 | Iwata |
| 6,555,417 B2 | 4/2003 | Spooner et al. |
| 6,559,530 B2 | 5/2003 | Hinzel et al. |
| 6,571,630 B1 | 6/2003 | Weinberg et al. |
| 6,598,476 B2 * | 7/2003 | Terada et al. ............. 73/504.16 |
| 6,621,137 B1 | 9/2003 | Ma et al. |
| 6,628,177 B2 | 9/2003 | Clark et al. |
| 6,651,500 B2 | 11/2003 | Stewart et al. |
| 6,660,564 B2 | 12/2003 | Brady |
| 6,668,614 B2 | 12/2003 | Itakura |
| 6,794,272 B2 | 9/2004 | Turner et al. |
| 6,796,178 B2 | 9/2004 | Jeong et al. |
| 6,823,733 B2 | 11/2004 | Ichinose |
| 6,845,669 B2 | 1/2005 | Acar et al. |
| 6,854,315 B2 | 2/2005 | Wyse |
| 6,856,217 B1 | 2/2005 | Clark et al. |
| 6,860,150 B2 | 3/2005 | Cho |
| 6,892,575 B2 | 5/2005 | Nasiri et al. |
| 6,918,297 B2 | 7/2005 | MacGugan |
| 6,918,298 B2 | 7/2005 | Park |
| 6,938,484 B2 | 9/2005 | Najafi et al. |
| 6,939,473 B2 | 9/2005 | Nasiri et al. |
| 6,955,086 B2 | 10/2005 | Yoshikawa et al. |
| 6,981,416 B2 | 1/2006 | Chen et al. |
| 7,004,025 B2 | 2/2006 | Tamura |
| 7,028,547 B2 | 4/2006 | Shiratori et al. |
| 7,051,590 B1 | 5/2006 | Lemkin et al. |
| 7,100,446 B1 | 9/2006 | Acar et al. |
| 7,104,129 B2 | 9/2006 | Nasiri et al. |
| 7,121,141 B2 | 10/2006 | McNeil |
| 7,196,404 B2 | 3/2007 | Schirmer et al. |
| 7,205,867 B2 | 4/2007 | Lutz et al. |
| 7,210,351 B2 | 5/2007 | Lo et al. |
| 7,227,432 B2 | 6/2007 | Lutz et al. |
| 7,247,246 B2 | 7/2007 | Nasiri et al. |
| 7,250,112 B2 | 7/2007 | Nasiri et al. |
| 7,284,430 B2 | 10/2007 | Acar et al. |
| 7,290,435 B2 | 11/2007 | Seeger et al. |
| 7,323,952 B2 | 1/2008 | Pan et al. |
| 7,363,814 B2 | 4/2008 | Okada |
| 7,430,909 B2 | 10/2008 | Adams et al. |
| 7,437,933 B2 * | 10/2008 | Durante et al. ............. 73/504.15 |
| 7,444,870 B2 * | 11/2008 | Uchiyama et al. .......... 73/504.12 |
| 7,458,263 B2 | 12/2008 | Nasiri et al. |
| 7,478,557 B2 | 1/2009 | Geen |
| 8,113,050 B2 | 2/2012 | Acar et al. |
| 8,176,779 B2 * | 5/2012 | Blomqvist ................. 73/504.12 |
| 8,322,213 B2 | 12/2012 | Trusov et al. |
| 8,429,970 B2 | 4/2013 | Rocchi |
| 2002/0051258 A1 | 5/2002 | Tamura |
| 2002/0189352 A1 | 12/2002 | Reeds et al. |
| 2002/0189353 A1 * | 12/2002 | Knowles et al. ........... 73/504.12 |
| 2003/0074967 A1 | 4/2003 | Tang et al. |
| 2003/0110858 A1 | 6/2003 | Kim et al. |
| 2003/0164041 A1 | 9/2003 | Jeong et al. |
| 2004/0055380 A1 | 3/2004 | Shcheglov et al. |
| 2005/0066728 A1 | 3/2005 | Chojnacki |
| 2005/0072231 A1 | 4/2005 | Chojnacki |
| 2005/0081633 A1 * | 4/2005 | Nasiri et al. ............... 73/514.29 |
| 2005/0170656 A1 | 8/2005 | Nasiri et al. |
| 2005/0199061 A1 | 9/2005 | Acar et al. |
| 2006/0070441 A1 * | 4/2006 | Durante et al. ............. 73/504.12 |
| 2006/0156814 A1 * | 7/2006 | Blomqvist ................. 73/504.12 |
| 2007/0180909 A1 * | 8/2007 | Uchiyama et al. .......... 73/504.14 |
| 2007/0194857 A1 * | 8/2007 | Schwarzelbach ............... 331/23 |
| 2007/0214883 A1 * | 9/2007 | Durante et al. ............. 73/504.04 |
| 2007/0220971 A1 | 9/2007 | Ayazi et al. |
| 2007/0240508 A1 * | 10/2007 | Watson ..................... 73/504.12 |
| 2008/0115579 A1 | 5/2008 | Seeger et al. |
| 2009/0064780 A1 | 3/2009 | Coronato et al. |
| 2009/0260437 A1 * | 10/2009 | Blomqvist ................. 73/504.12 |
| 2009/0308201 A1 * | 12/2009 | Romano ..................... 74/84 R |
| 2010/0263446 A1 * | 10/2010 | Tamura et al. ............. 73/504.12 |
| 2011/0061460 A1 * | 3/2011 | Seeger et al. ............. 73/504.12 |
| 2011/0094301 A1 * | 4/2011 | Rocchi ..................... 73/504.08 |
| 2012/0048017 A1 * | 3/2012 | Kempe ..................... 73/504.12 |

OTHER PUBLICATIONS

PCT, Notification of Transmittal of the International Search Report and the Written Opinion of the International Searching Authority, or the Declaration, Feb. 7, 2008.

* cited by examiner

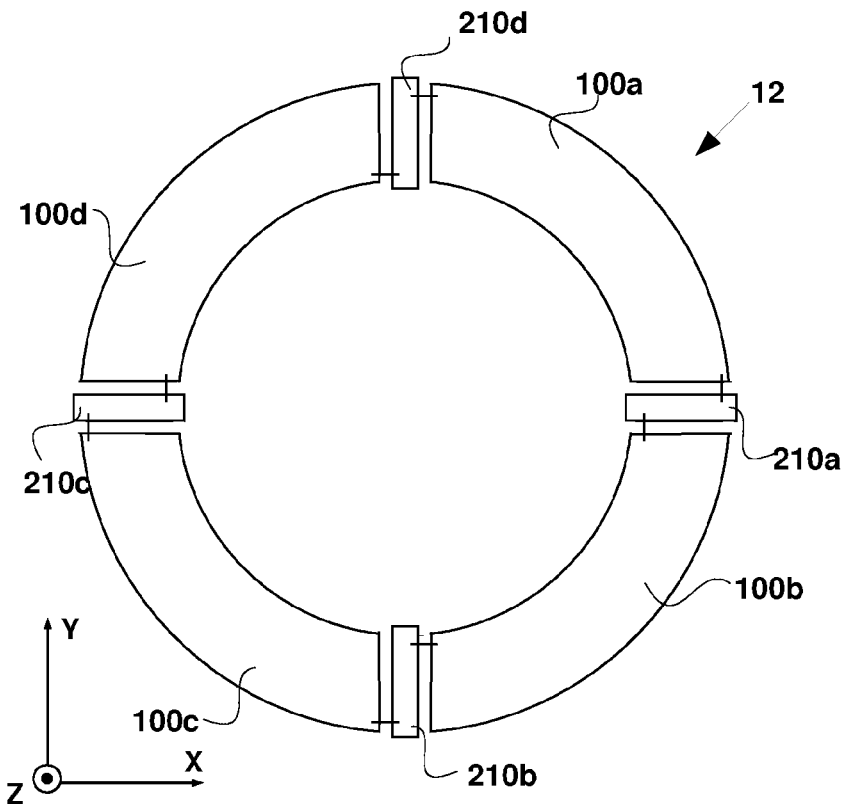
FIG. 2a
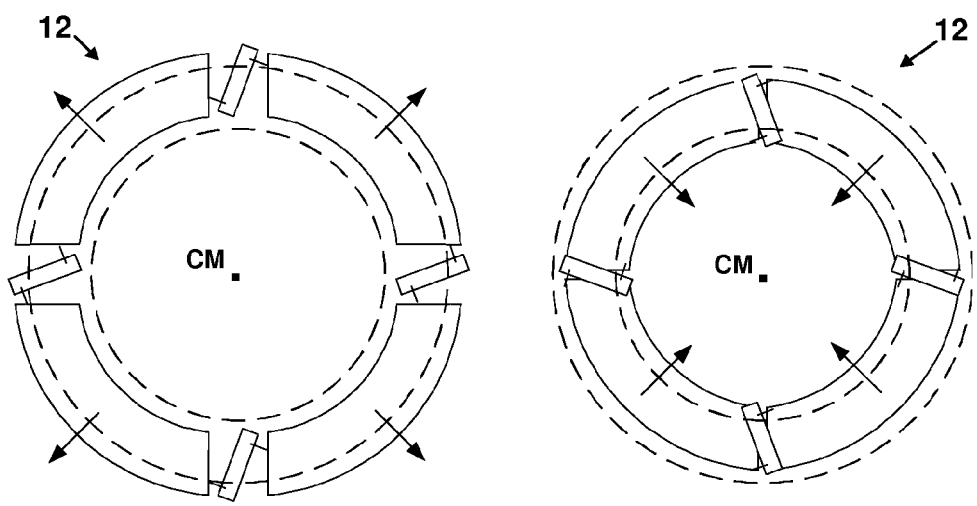
FIG. 2c  FIG. 2b

Z INPUT AXIS

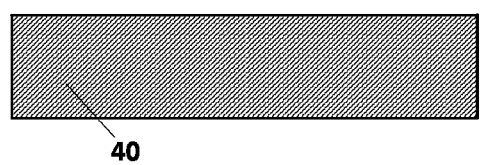
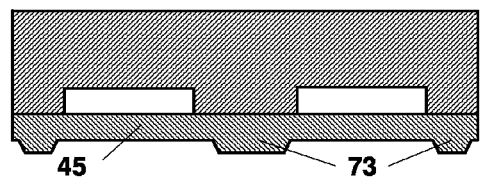
FIG. 15a  FIG. 15e
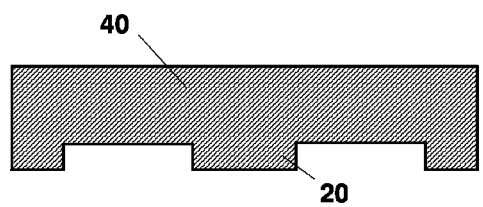
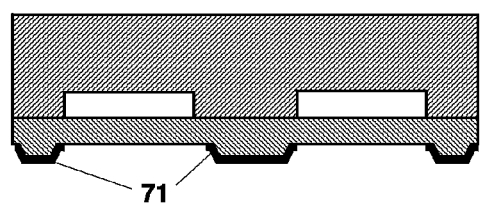
FIG. 15b  FIG. 15f
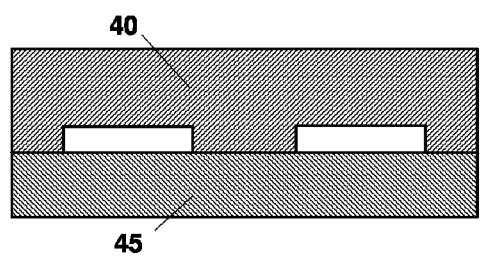
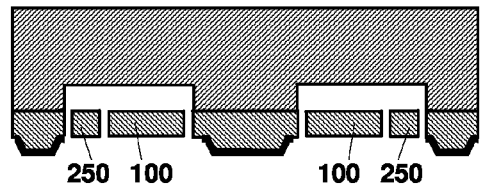
FIG. 15c  FIG. 15g
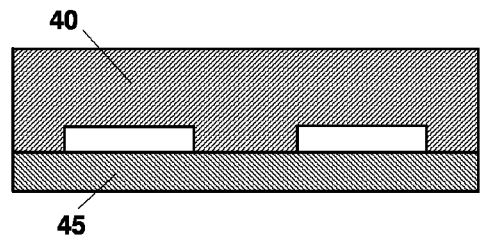
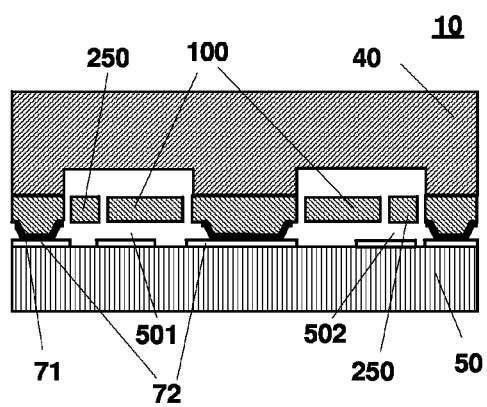
FIG. 15d  FIG. 15h

EXTENSION-MODE ANGULAR VELOCITY SENSOR

FIELD OF THE INVENTION

The present invention relates to vibratory angular velocity sensors, and more particularly to an angular velocity sensor having a single drive system.

BACKGROUND OF THE INVENTION

Microelectromechanical systems (MEMS) technology has been under steady development for some time, and as a result various MEMS devices, including gyroscopes, have been implemented within several applications. MEMS gyroscopes generally belong to a vibratory mass class of gyroscopes.

Typically a vibratory angular rate sensor comprises a single drive and a single sense subsystem. The drive subsystem is driven into oscillation at the resonant frequency of the drive mode. A Coriolis force acts on the oscillating drive subsystem and generates force which is then transferred to the sense subsystem. Consequently, the sense subsystem moves at the drive frequency proportional to the input rate of rotation and that motion is typically sensed by an appropriate transducer.

One problem with this type of sensor is the duplication of driving system and drive electronics. A drive system and sense subsystem is needed for each axis in which angular velocity is desired to be sensed, so that at least three drive systems are needed to cover all three axes.

Some types of angular rate sensors have provided a single drive system with a sensing subsystem that senses in multiple axes. For example, U.S. Patent Publication No. 2007/0220971 by Ayazi et al. describes a single bulk structure driven at multiple drive frequencies and is used to sense three input axes. U.S. Patent Publication No. 2007/0214883 by Durante et al. describes a single structure driven at a single drive frequency and used to sense three input axes. Patent application 20090064780 by Coronato et al. where a single structure driven at single drive frequency is used to sense three input axes. None of these structures use expanding members (an extension mode). Other devices, such as resonators, have been provided with single structures having an expanding member. For example, U.S. Pat. No. 7,323,952 by Pan et al. describes a bulk resonator including a breathing-like mode of expansion thus describing bulk structures and not discrete mass structures. U.S. Pat. Nos. 7,205,867 and 7,227,432 by Lutz et al. describe a resonator including nodal points and "breathing" and "bending" movement. These structures involve nodal points, i.e. points where masses do not move. U.S. Pat. No. 7,363,814 by Okada describes a device having one mass moving in different directions. U.S. Pat. Nos. 6,856,217 and 6,628,177 by Clark et al. describe an expanding resonator for filtering and oscillator applications.

These prior devices are all limited in various ways and none allow for an angular rate sensor using a single drive system moving in an extension mode and multiple masses and which can provide one or more sensing axes.

SUMMARY OF THE INVENTION

The inventions of the present application relate to an angular rate sensor providing multiple masses that move in an extension mode. In one aspect of the invention, an angular rate sensor includes a base and at least three masses disposed substantially in a plane parallel to the base, the masses having a center of mass. At least one actuator drives the masses in an extension mode, such that in the extension mode the masses move in the plane simultaneously away or simultaneously towards the center of mass. At least one transducer senses at least one Coriolis force resulting from motion of the masses and angular velocity about at least one input axis of the sensor. Additional embodiments can include a linkage that constrains the masses to move in the extension mode.

An angular rate sensor of the present inventions includes a drive system based on an extension vibratory mechanical mode. This mode provides a simpler system, reducing costs of the sensor. Multiple sensing axes can share the single drive system, and a single drive mode and drive circuit can be used, simplifying the sensor and reducing cost and power consumption.

BRIEF DESCRIPTION OF THE DRAWINGS

FIGS. 1b and 1c are top plan views illustrating an extension mode of the angular rate sensor of FIG. 1a;

FIG. 2a is a top plan view of another embodiment of an angular rate sensor in accordance with the present invention;

FIGS. 2b and 2c are top plan views illustrating an extension mode of the angular rate sensor of FIG. 2a;

FIGS. 15A-15H illustrate the basic steps of Nasiri-fabrication of an angular rate sensor of the present invention.

DETAILED DESCRIPTION OF PREFERRED EMBODIMENTS

The present invention relates to angular velocity sensors, and more particularly to a multi-axis angular velocity sensor having a single drive system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A drive system of the disclosed single-drive angular rate sensor is based on an "extension" or "extending" vibratory mechanical mode. When a mechanical structure of the angular rate sensor is oscillated in the extension mode, the mechanical structure generates Coriolis forces around three orthogonal axes resulting from rotation of the angular rate sensor around three input axes. An advantage of the extension mode is the simplicity of the achievable design. Consequently, a significantly smaller size design is possible. This in turn reduces production costs. Another advantage of the disclosed angular rate sensor is a single drive mode. The single drive mode requires a single drive circuit, e.g., a circuit that includes a single pick-up circuit and a single oscillation loop circuit. Consequently, the power consumption is significantly reduced and the electronics simplified relative to prior designs. The angular rate sensor of the present inventions allows the single drive system to be shared by multiple sensing systems, e.g., multiple axes of motion can be sensed when using the single drive system.

Any of the embodiments of the inventions described herein can be implemented as a microelectromechanical systems (MEMS) sensor. For example, in various embodiments the base 10 can be provided as an appropriate substrate, the sensor components can be hermetically sealed, and/or other well-known MEMS techniques can be used.

Figure 1A:
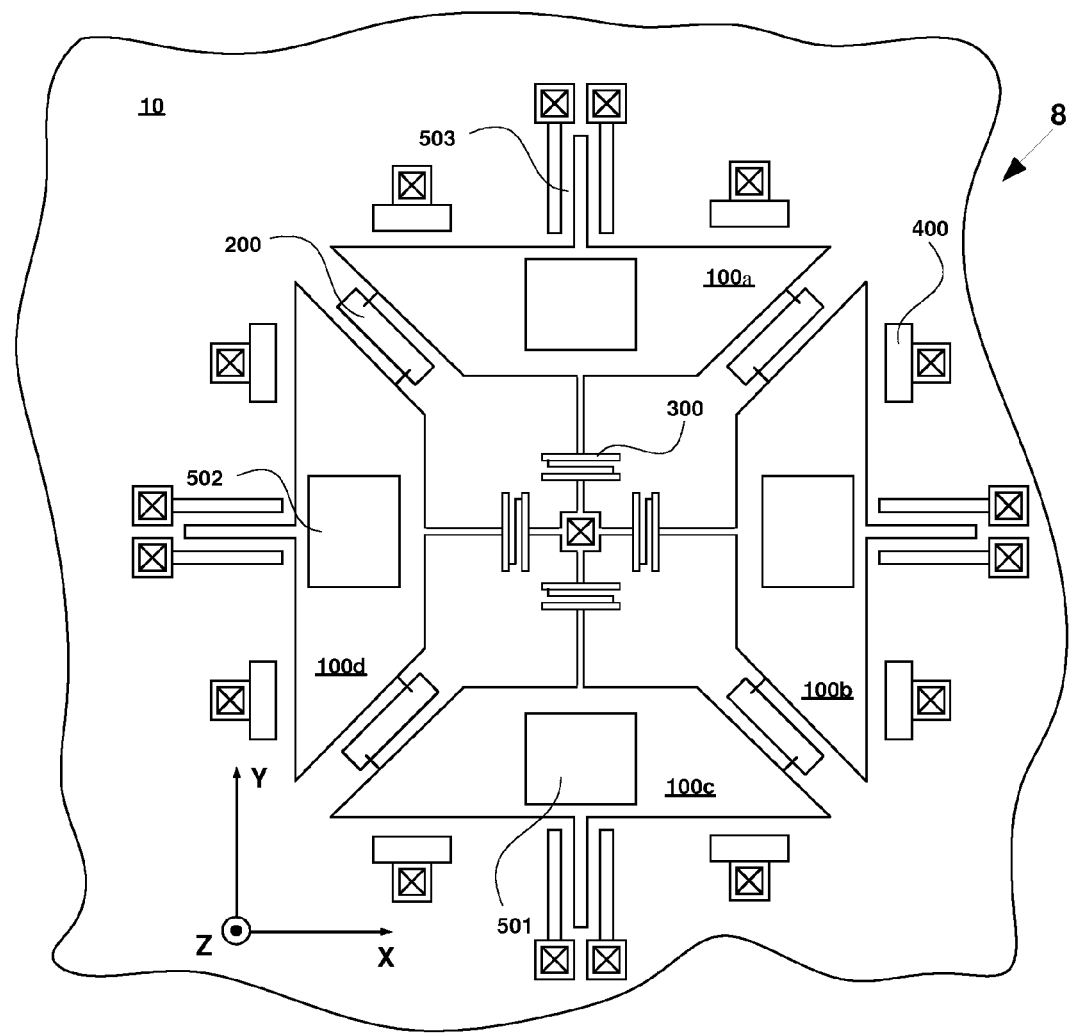
FIG. 1a is a top plan view of an embodiment of an angular rate sensor of the present invention.

Referring to FIG. 1a, a first embodiment of an angular rate sensor 8 of the present invention is disclosed. The angular rate sensor 8 may sense a rate of rotation of the sensor 8, i.e. angular velocity, about at least one of three input axes. In the described example, the X axis may be a first input axis, the Y axis may be a second input axis, and a Z axis may be a third input axis.

The angular rate sensor 8 includes a base 10 and a plurality of proof masses 100, indicated specifically in FIG. 1a as masses 100a-d, disposed within a plane parallel to the base. The plane parallel to the base and defined by the masses 100a-d, i.e. the X-Y plane extending through the center of the masses 100, is referred to herein as the "mass plane." The proof masses 100a-d in the described embodiment are multiple discrete masses and are shown to form a rectangle or square shape when viewed as in FIG. 1a, but may be other shapes in other embodiments (e.g., as in FIG. 2a described below). In some embodiments the masses 100a-d can be substantially planar or flat, with a small (Z-axis) thickness relative to their length and width, where the masses lie substantially in the mass plane. For example, in some embodiments the masses can have a length and/or width approximately 10-30 times the thickness, but can vary even more in other embodiments. Other embodiments can allow different mass thicknesses.

The sensor further includes at least one actuator 400 to set the masses 100a-d into motion within the mass plane, and at least one transducer 501, 502 and/or 503, to sense at least one Coriolis (external) force. The transducer 501 may sense motion around the X axis, the transducer 502 may sense motion around the Y axis, and the transducer 503 may sense motion around the Z axis. The angular rate sensor can further include anchoring linkages 300. The anchoring linkages 300 couple and suspend the masses 100a-d to the base 10. Furthermore, the angular rate sensor 8 includes a linkage 200 that flexibly couples the masses 100a-d to each other, such that each mass 100a-d is flexibly coupled to two of the other masses 100a-d. In some embodiments, the linkage 200 can include linkage portions as shown, where each linkage portion connects two adjacent proof masses 100a-d, as described in greater detail below with respect to FIG. 7.

Figure 1B:
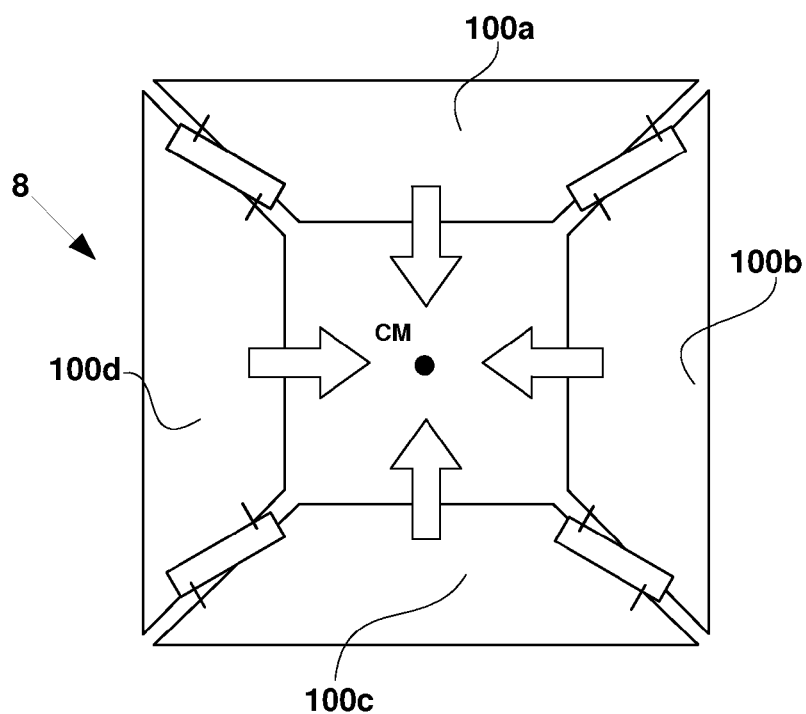
Figure 1C:
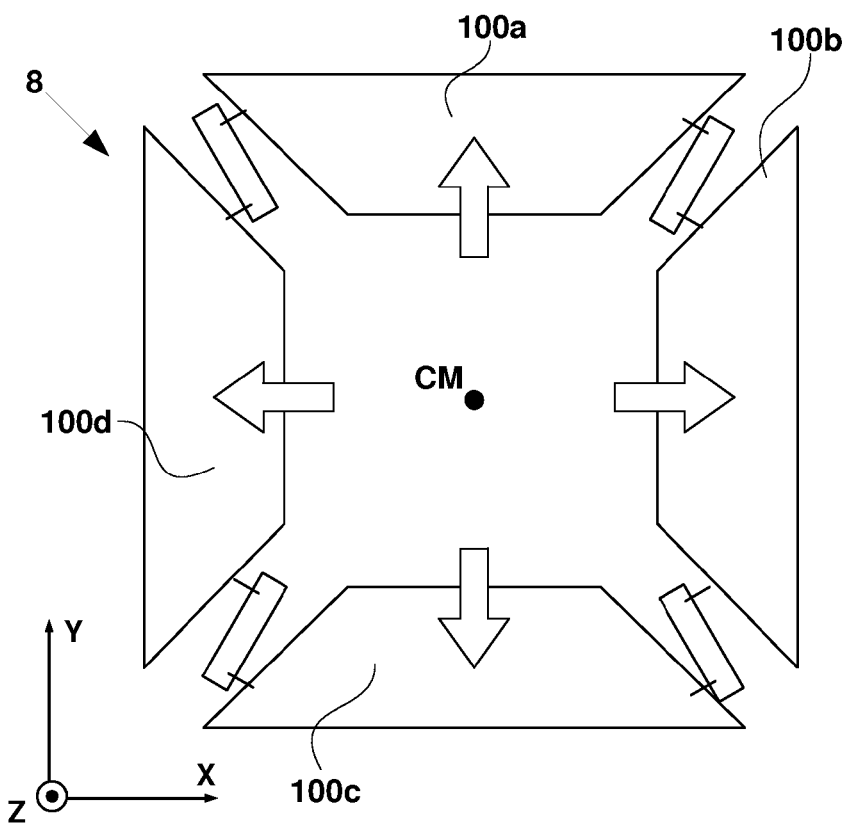

Referring to FIG. 1b and FIG. 1c, the angular rate sensor 8 may have an extension mode in which the masses 100a-d move substantially in a plane and simultaneously move away (FIG. 1c) or towards (FIG. 1b) a center of mass CM defined by the masses 100a-d. The center of mass CM of the masses 100a-d is shown as an example, and is approximately in the same mass plane defined by the masses 100a-d. In one implementation, the extension mode may be implemented using proof masses 100a-d moving simultaneously inwards toward or outwards from the center of mass, wherein each mass moves along a line radiating substantially from the center of mass such that the center of mass of the masses 100a-d does not substantially move, e.g., the masses 100a-d all move approximately the same distance from the center of mass CM. In the described embodiments, the extension mode may be a drive mode of the angular rate sensor, such that the actuator(s) causes the extension mode movement of the masses 100. The linkage 200 may constrain the plurality of masses to substantially move only in the extension mode.

In some embodiments, the extension mode is a mechanical resonant mode, in which the proof masses 100a-d all follow the motion conforming to the shape (pattern of movement) of the extension mode at a single resonant frequency. There might be multiple resonant frequencies of the mechanical structure. The linkage 200 may make undesired resonant frequencies substantially higher than the resonant frequency of the extension mode. If the mechanical structure is operated by actuating the masses at the resonant frequency all masses move in the accordance to the extension mode. The motion of the structure at the resonant frequency of the extension mode causes a sufficient amount of oscillatory movement (mechanical amplitude) of the masses to allow accurate measurement of the resulting Coriolis force. This resonant frequency can be determined by experimentation, for example.

The sensor of the present invention can include a single-drive system, in which a single drive circuit (not shown) is connected to the actuator. For example, in some embodiments the single drive circuit can include a single pick-up circuit (including transducer(s) to measure the motion of the proof masses), a phase shifter (in some embodiments) to shift the phase of the measured signal, and a feedback circuit to provide the signal back to the actuator (e.g., drivers/amplifiers for providing the appropriate signal to the actuator). This single drive circuit may cause oscillations at mechanical resonant frequency. Thus, the masses 100a-d can be driven into the motion conforming to the shape (pattern of movement) of the extension mode using actuator 400, which is the single driven mode of the sensor. Coriolis forces resulting from the angular rate around multiple input axes can be sensed from the proof masses at the single drive frequency. Thus, multiple axes can be sensed based on the masses driven by a single actuator 400, if desired. For example, the sensor can use three transducers 501, 502, and 503 to sense angular motion of the masses about three different axes at the single drive frequency. This is advantageous in that only one set of drive circuitry is needed in a multi-axis sensing system, rather than a drive circuit needed for each sensed axis.

FIG. 2a is a top plan view of another embodiment of an angular rate sensor 12 in accordance with the present invention. Only the proof masses and the linkage are shown for clarity. In this embodiment, each of the proof masses 100a-d is curved such that the collective shape of the masses 100a-d is substantially circular when viewed down on the mass plane. The angular rate sensor may comprise four masses 100a-100d coupled through the linkage 200, where linkage 200 includes linkage portions 210a-d, each linkage portion 210a-d connecting two adjacent ones of the masses 100a-d, as described in greater detail below with respect to FIG. 7.

As shown in FIGS. 2b and 2c, the angular rate sensor 12 may have an extension mode. A center of mass CM of the masses 100a-d is shown as an example, and is approximately in the same mass plane defined by the masses 100a-d. In FIG. 2b, the masses 100a-d simultaneously move outwardly from the center of mass CM in the extension mode. In FIG. 2c, the masses 100a-d simultaneously move inwardly toward the center of mass CM in the extension mode.

Referring to FIG. 2a, a linkage portion 210a connects proof mass 100a and proof mass 100b. The linkage portion 210a allows mass 100a and mass 100b to move simultaneously along axes radiating from the center of the mass CM outwards, i.e. the linkage portion 210a is substantially compliant with respect to that motion. The linkage portion 210a allows mass 100a and mass 100b to move away from or towards each other along the axis orthogonal to the axis radiating from the center of mass outwards, i.e. the linkage portion 210a is substantially compliant with respect to that motion. The linkage portion 210a does not allow mass 100a and mass 100b to move in an opposite direction from each other along the axes radiating from the center of the structure, i.e. the linkage portion 210a is substantially stiff with respect to that motion. The linkage portion 210a does not allow mass 100a and the mass 100b to move in an opposite direction from each other along the axis normal to the base, i.e. the linkage portion 210a is substantially stiff with respect to that motion.

Similarly, a linkage portion 210b connects mass 100b and mass 100c, a linkage portion 210c connects mass 100c and mass 100d and a linkage portion 210d connects mass 100a and mass 100d. The linkage portions 210b-210d have similar properties as the portion of the linkage 210a which are described above.

As a result, the overall stiffness of the structure comprising the masses 100a-d and the linkage 210a-d is substantially low with respect to any simultaneous extension or contraction of the masses 100a-d in the mass plane, as when moving in the extension mode. Moreover, any other combination of in-plane motion of the masses 100a-d other than the motion defined by the extension mode may be designed to be substantially stiff. Similarly, the overall out-of-plane stiffness of the structure is substantially high and the linkage portions 210a-d may be designed so that the two neighboring masses are rigidly coupled in out-of-plane direction.

Overall, by designing the linkage correctly, the plurality of masses may be made substantially stiff for all motions except for motion in the extension mode. Thus, the linkage portions 210a-d flex to accommodate the movement of the masses 100a-d in the extension mode as shown in FIGS. 2b and 2c and are stiff in other axes, and therefore the linkage 200 constrains the masses to move only in the extension mode, i.e. only within the mass plane and simultaneously away or toward the center of mass of the masses. The masses 100a-d consequently behave as a solid plate with respect to rotations about X, Y and Z axes. The extension mode may be a drive mode of the angular rate sensor, such that the actuator causes the extension mode movement. Furthermore, the drive mode can be a mechanical resonant mode in which the proof masses 100a-d are driven at a resonant frequency of the mechanical structure, similarly as described above for the embodiment of FIGS. 1a-1c. In some embodiments, the center of mass does not substantially move as a result of the movement of masses 100a-d.

Figure 3A:
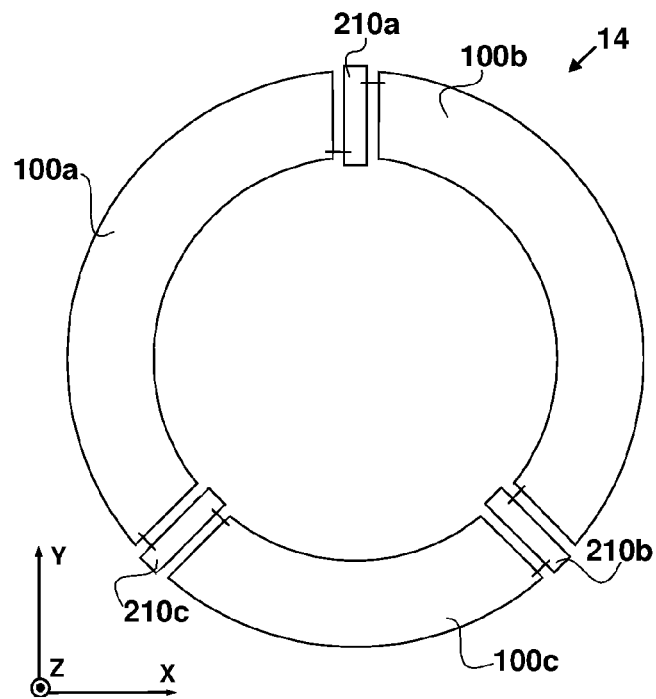
FIGS. 3a and 3b are top plan views illustrating other example embodiments in which the angular rate sensor includes different numbers of proof masses.

FIG. 3a illustrates another example embodiment 14 in which the angular rate sensor may comprise three proof masses 100a-100c coupled through the linkage 200 further comprising at least three linkage portions 210a-210c and appropriate flexures. Only the proof masses and the linkage are shown for clarity. In the embodiment of FIG. 3a, the masses form an approximate circle when viewed, as shown, above the mass plane defined by the masses 100a-d. In other embodiments, other shapes of masses can be employed. Properties of the linkage and masses are similar to the properties of the linkage and masses as discussed in the embodiment above and shown in FIG. 2a.

Figure 3B:
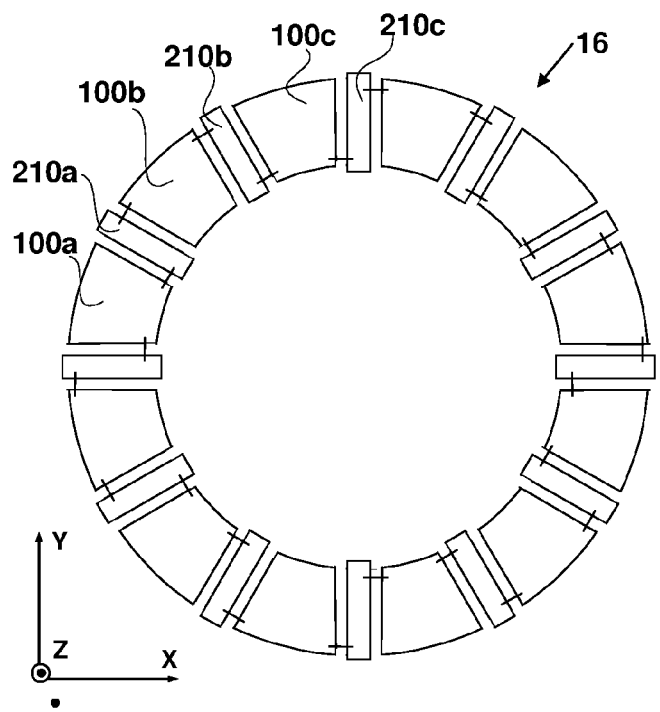

In another embodiment 16 as shown in FIG. 3b, the angular rate sensor may comprise a larger number of proof masses 100 coupled mutually through a linkage 200 further comprising multiple linkage portions 210 and appropriate flexures. Only the proof masses and the linkage are shown for clarity. Properties of the linkage and masses are similar to the properties of the linkage and masses as discussed in the embodiment above and shown in FIG. 2a. Thus, a different number of masses and linkage portions can be used in various embodiments.

Figure 4A:
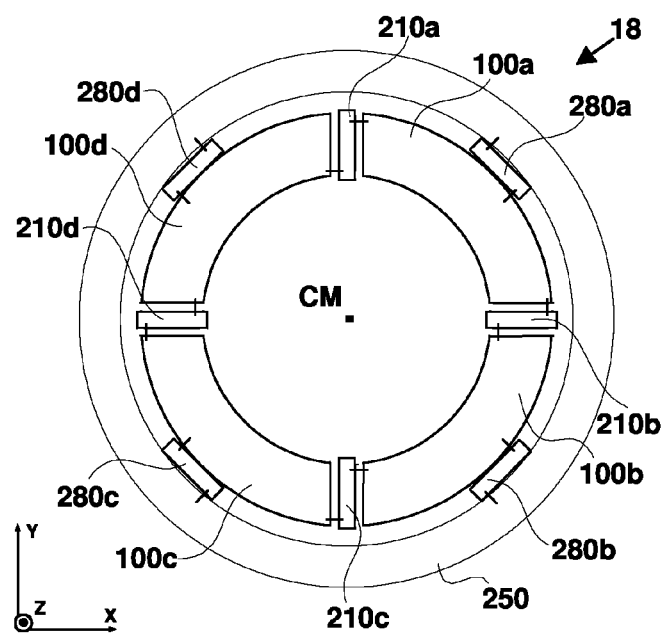
FIGS. 4a, 4b, and 4c are top plan views of embodiments of the angular rate sensor of the present invention showing the use of a frame.

Referring to FIG. 4a, an embodiment 18 of the angular rate sensor shows the use of a frame 250. Approximately circular proof masses 100a-d are used as an example. In this embodiment, the linkage 200 may comprise the linkage portions 210a-d and further comprise a substantially planar frame 250 that encircles or surrounds the masses 100a-100d within the mass plane, i.e. the outsides of the masses within the mass plane are surrounded by the frame 250. Furthermore, the linkage 200 may include frame flexures 280a-d. Four frame flexures 280a-d are shown in the described embodiment of FIG. 4a, but other embodiments can provide different numbers of flame flexures. At least one of the masses 100a-d may be flexibly coupled to the frame through a frame flexure 280.

In one implementation, each of the flexures 280a-d may be substantially compliant in a direction along the axes radiating from the center of the mass CM within the mass plane, and may be substantially stiff in both the axis normal to the mass plane, and within the mass plane along the axis normal to the axis radiating from the center of the mass. A function of the frame 250 and flexures 280 is to enhance the overall out-of-plane stiffness of the structure. Furthermore, any motion of the masses 100a-d relative to the frame 250 in an out-of-plane direction is substantially stiff. Also, in-plane motion of any mass 100 relative to the frame 250 in the direction normal to the axis and radiating from the center of the mass outwards is substantially reduced. Consequently, by adding the frame 250 to the linkage 200, the overall stiffness of the structure may be made substantially higher for all motions except for the desired motion in the extension mode, causing the structure to be even more "plate-like."

Figure 4B:
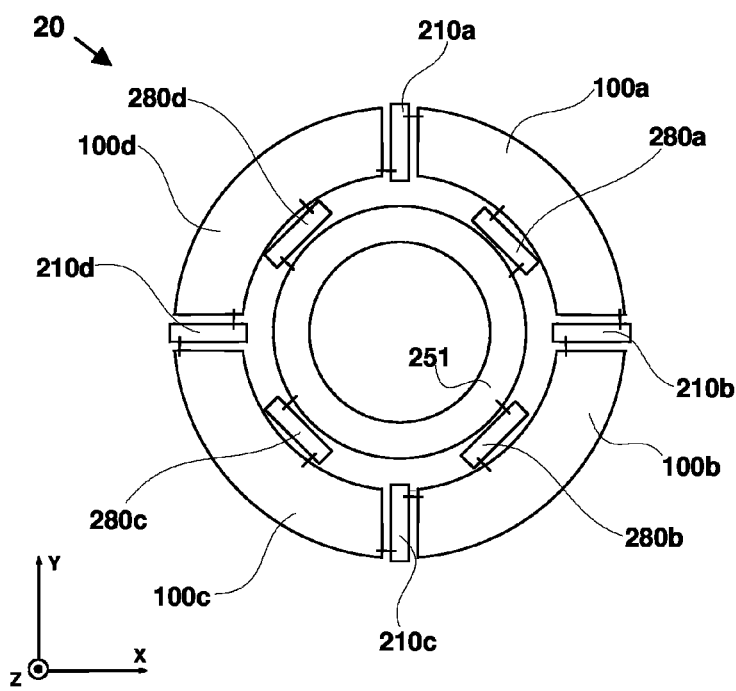
Figure 4C:
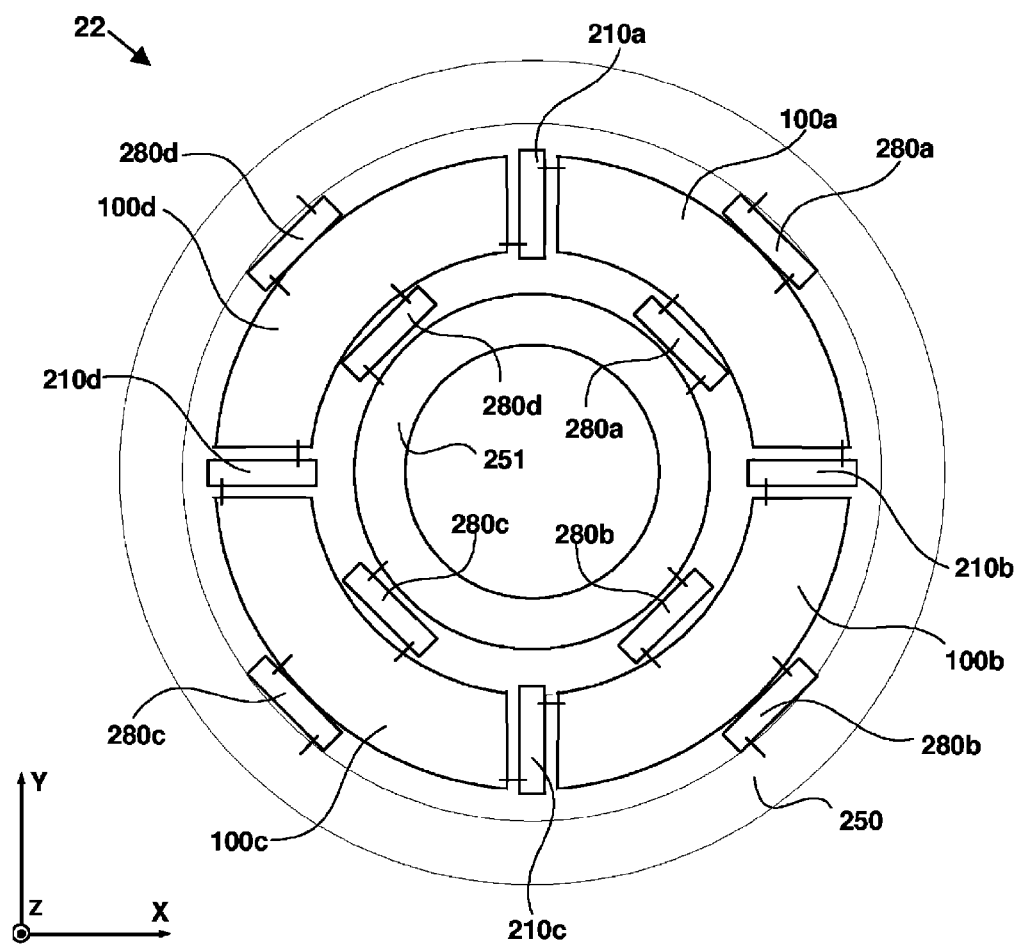

Referring to FIG. 4b, in another embodiment 20 of the angular rate sensor, a frame 251 may be encircled or surrounded by the proof masses 100, where the outside of the frame within the mass plane is surrounded by the masses 100. The masses 100 are connected to the frame 251 by frame flexures 280. A function of the frame is similar to the frame 250 encircling the masses 100 as explained above. Referring to FIG. 4c, in yet another embodiment 22, the frame may be a multi-part frame that includes an inner first frame 251 encircled or surrounded by the plurality of masses 100, and also including an outer second frame 250 encircling or surrounding the proof masses. The frames 251 and 250 may have the same functionality as the single-frame designs described above.

Figure 5:
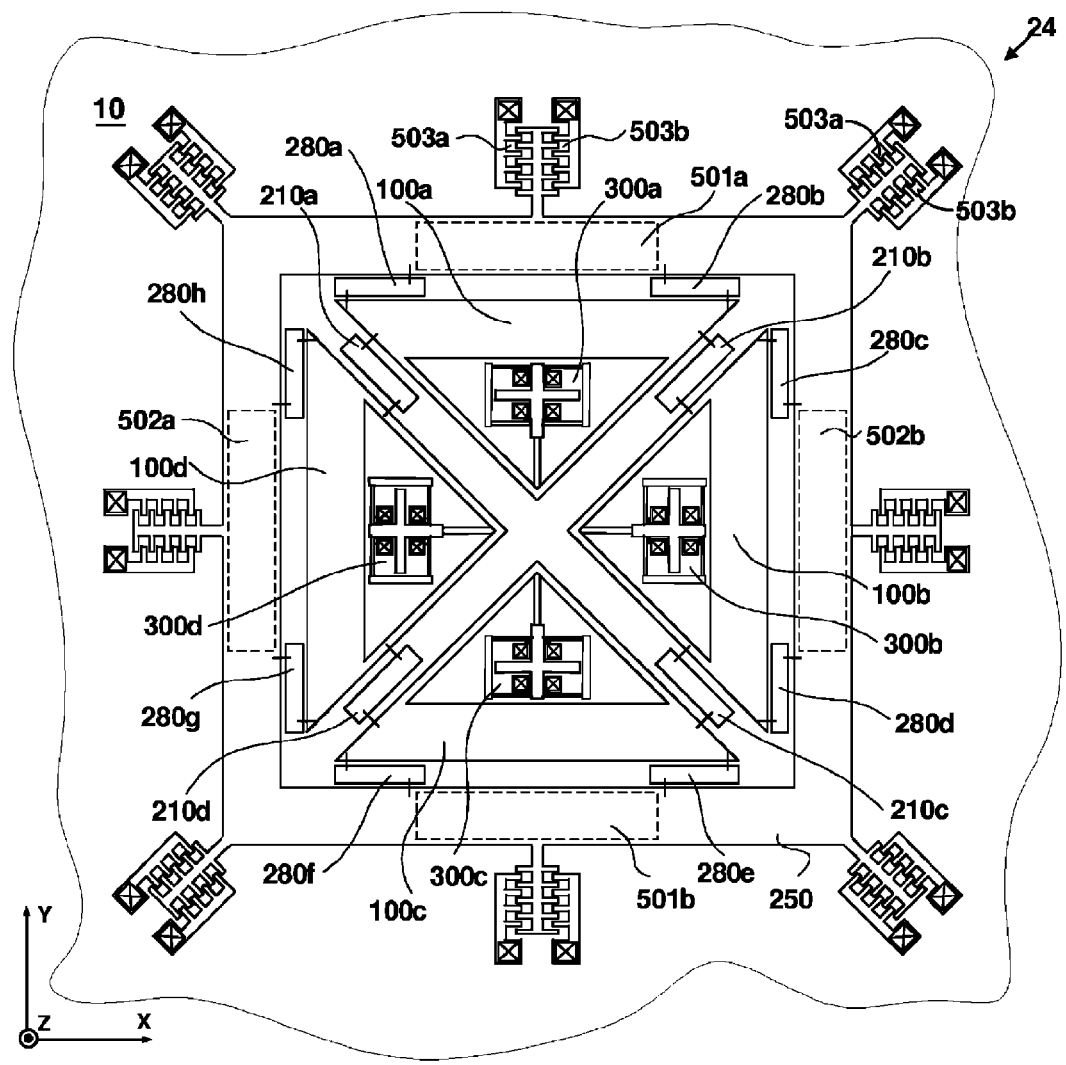
FIG. 5 is a top plan view of an example of a more-detailed implementation of the angular rate sensor of the present invention.

Referring to FIG. 5, one example of a more-detailed implementation 24 of the angular rate sensor is shown. The angular rate sensor 24 comprises four masses 100a-d disposed in a plane. The four masses 100a-d are coupled through the plurality of the linkage portions 210a-d. Furthermore, the masses 100a-d are encircled or surrounded by the frame 250. The masses 100a-d and the frame 250 are coupled through the frame flexures 280a-h. The masses 100a-d and the linkage 200, where the linkage 200 includes the linkage portions 210a-d, the frame 250, and the frame flexures 280, form a stiff, plate-like structure. The linkage 200 constrains the masses such that the only substantial allowable motion is that of the masses 100a-d moving in the extension mode in the mass plane.

Referring to FIG. 5, one or more transducers may be added to the sensor in order to sense Coriolis forces induced on the masses 100. In one implementation the transducers may be capacitive. In order to sense Coriolis forces around the first input axis, i.e. X axis, in one implementation, the transducer includes a pair of electrodes 501a-b that may be placed underneath the frame 250 (with respect to the view of FIG. 5) such that in response to the frame 250 and masses 100 rotating around the first axis, the transducer 501a-b senses Coriolis force. Similarly, in order to sense Coriolis forces around the second input axis, i.e. Y axis, in one implementation, a transducer includes a pair of electrodes 502a-b that may be placed underneath the frame 250 such that in response to the frame 250 and masses 100 rotating around the second axis, the transducer 502a-b detects Coriolis force.

In some embodiments, and referring to FIG. 5, a transducer for the third input axis, i.e. Z axis, may be implemented as an in-plane capacitor. In one implementation the Z-axis transducer may be a lateral comb capacitor, as shown. In another implementation it may be a parallel plate capacitor. In order to detect Coriolis forces around the third input axis, the transducer includes at least one pair of electrodes 503a-b, where a pair of electrodes 503a-b may be placed at one or more locations around the frame 250 such that in response to the frame 250 and masses 100 rotating around the third axis, the transducer(s) 503a-b detect Coriolis force-induced motion. For example, 8 pairs of electrodes 503a-b are shown in FIG. 5, but in other embodiments there may be fewer or more transducer pairs spaced around the sensor. In another implementation, the transducers 501a-b, 502a-b and 503a-b may be single-ended, i.e., only one of the transducer components 501a or 501b, 502a or 502b, and 503a or 503b, need be used. In another implementation, the transducers 501a-b, 502a-b and 503a-b may be attached directly to the masses 100a-d. In other implementations transducers 501 and 502 may be provided beneath the masses 100a-d instead of beneath frame 250 as shown, and in other implementations the transducer 503 may be coupled to the masses 100a-d instead of the frame 250 as shown (e.g. in embodiments without a frame 250, or alternatively in embodiments including a frame).

The four masses 100a-d can be flexibly coupled to the base 10 through a plurality of anchoring linkages 300a-d. The anchoring linkages 300a-d are compliant so that masses 100a-d may move in the extension mode. The anchoring linkages 300a-d are also compliant so that the masses 100a-d and frame 250 can move substantially together around the X axis, and are compliant so that the masses 100a-d and frame 250 to move substantially together around the Y axis. Finally, the anchoring linkages 300a-d are compliant so that the masses 100a-d and frame 250 can move substantially together around the Z axis.

Figure 6A:
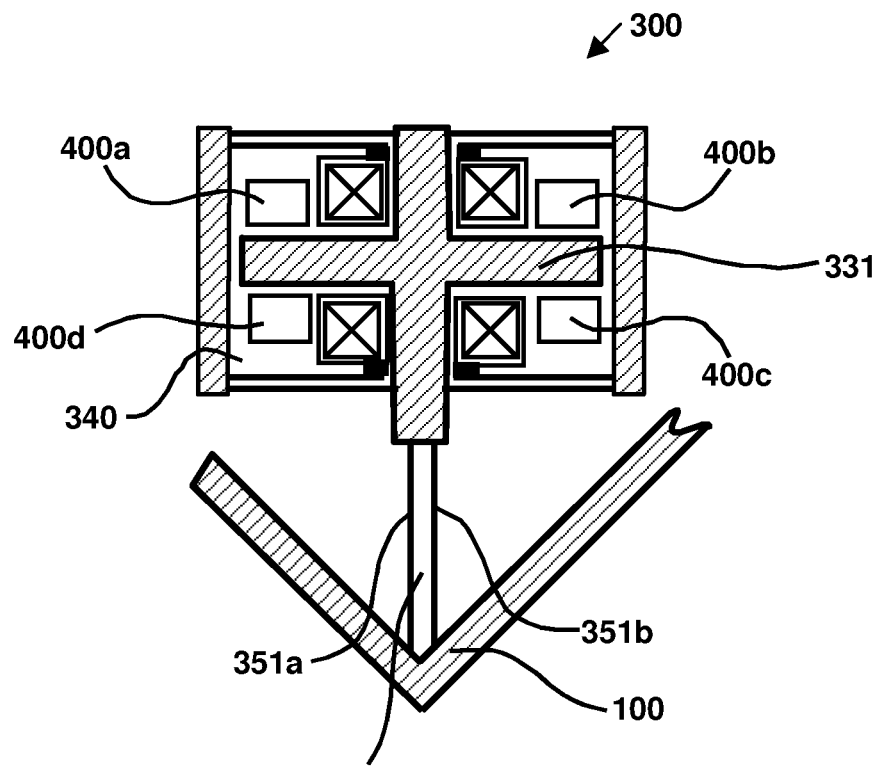
FIGS. 6a and 6b are top plan views of examples of an anchoring linkage and anchoring flexure of the angular rate sensor of the present invention.

Referring to FIG. 6a, an anchoring linkage 300 is now described. Each anchoring linkage 300 may comprise an actuator mass 331, an anchoring flexure 340 and a coupling flexure 350. The anchoring flexure 340 ensures that the actuator mass moves within the mass plane approximately along the line radiating from the center of mass (or approximately in a similar direction). The anchoring flexure is substantially stiff to rotation around the axis normal to the plane. This feature ensures that no parasitic Coriolis-like motion around the axis normal to the plane occurs on the associated mass 100 that is coupled to the anchoring linkage 300.

Figure 6B:
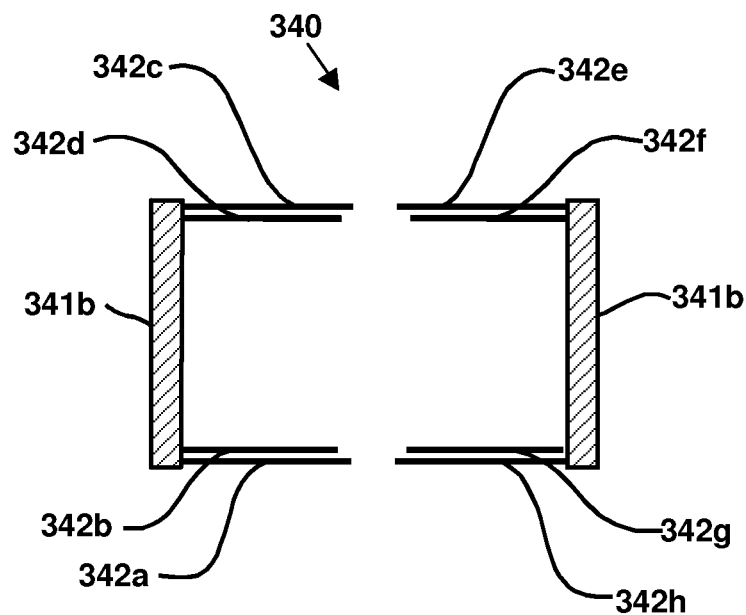

One example implementation of the anchoring flexure 340 is shown in FIG. 6b. In this embodiment, the anchoring flexure may be a folded flexure comprising two actuator guiding arms 341a-b and a total of eight beams 342a-h. Other configurations and number of guiding arms and beams can be used in other embodiments.

Referring to FIG. 6a, an actuator 400 including components 400a-d may be used to set actuator mass 331 into motion. The associated mass 100 coupled to the mass 331 is set into motion through coupling flexure 350 that is substantially stiff along the axis radiating from the center of the mass so that actuator mass 331 and the mass 100 move substantially together in extension mode. The actuator may be electrostatic, for example. In one implementation, the motion of each mass 100 may be sensed in-plane by one or more appropriate transducers. In another implementation, the motion of each actuator mass 331 may be sensed in-plane by one or more appropriate transducers. The transducers may be capacitive, for example. Some embodiments may include the transducers as some of the components 400a-d. For example, in some embodiments, components 400a and 400c may be actuators, and components 400b and 400d may be transducers that measure motion of the actuator mass 331 and the associated mass 100 to provide a feedback drive signal to the actuators. In still other embodiments, each component 400a-d may be split to include an actuator as well as a transducer.

In one implementation, and referring to FIG. 6a, the coupling flexure 350 may comprise two parallel beams 351a-b. The beams 351a-b may be considered a single beam that is split into two components. By adjusting one or more of these two components, out-of-plane stiffness of the coupling flexure 350 is preserved while in-plane and torsional stiffness of the coupling flexure can be easily adjusted to substantially match each other.

Figure 7:
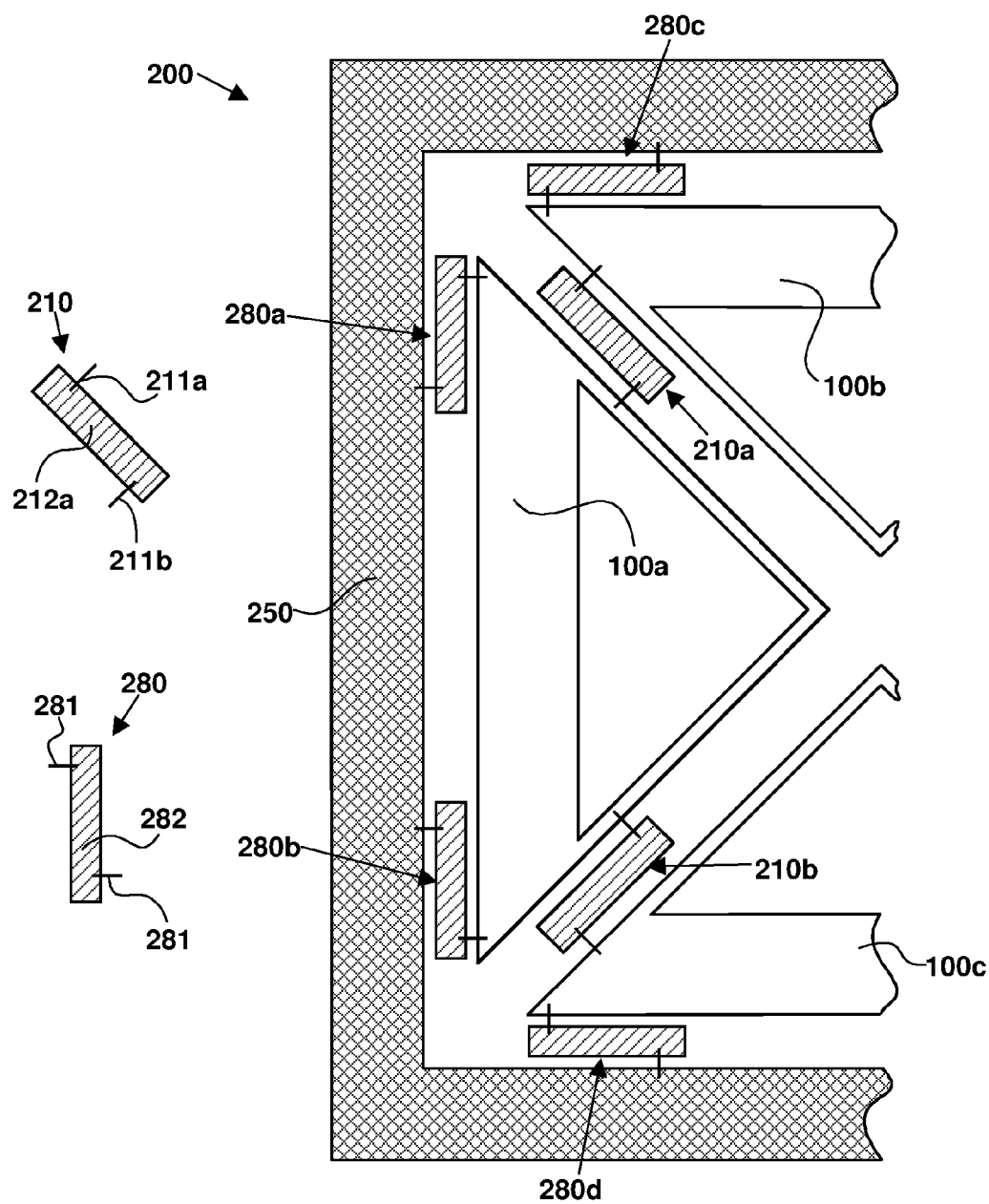
FIG. 7 is a top plan view of an example linkage for use with the angular rate sensor of the present invention.

Referring to FIG. 7, the linkage 200 is now described. The linkage 200 comprises the frame 250, the linkage portions 210, and the frame flexures 280. The masses 100 are flexibly coupled to the linkage 200. In one implementation the linkage portions 210 may each comprise mass flexures 211a and 211b and a mass guiding arm 212, in which the mass flexures 211 couple the mass guiding arm 212 to a mass on either side of the mass guiding arm 212, such as mass 100a and mass 100b, or mass 100a and mass 100c. Additional mass flexures 211 can be used in other embodiments. Similarly, in one implementation the frame flexures 280 may each comprise mass flexures 281 and a mass guiding arm 282, in which one mass flexure 281 couples the mass guiding arm 282 to the frame 250, and the other mass flexure 281 couples the mass guiding arm 282 to a mass 100. Additional mass flexures 281 can be used in other embodiments. Other embodiments can use different forms of flexures and linkage portions.

Figure 8:
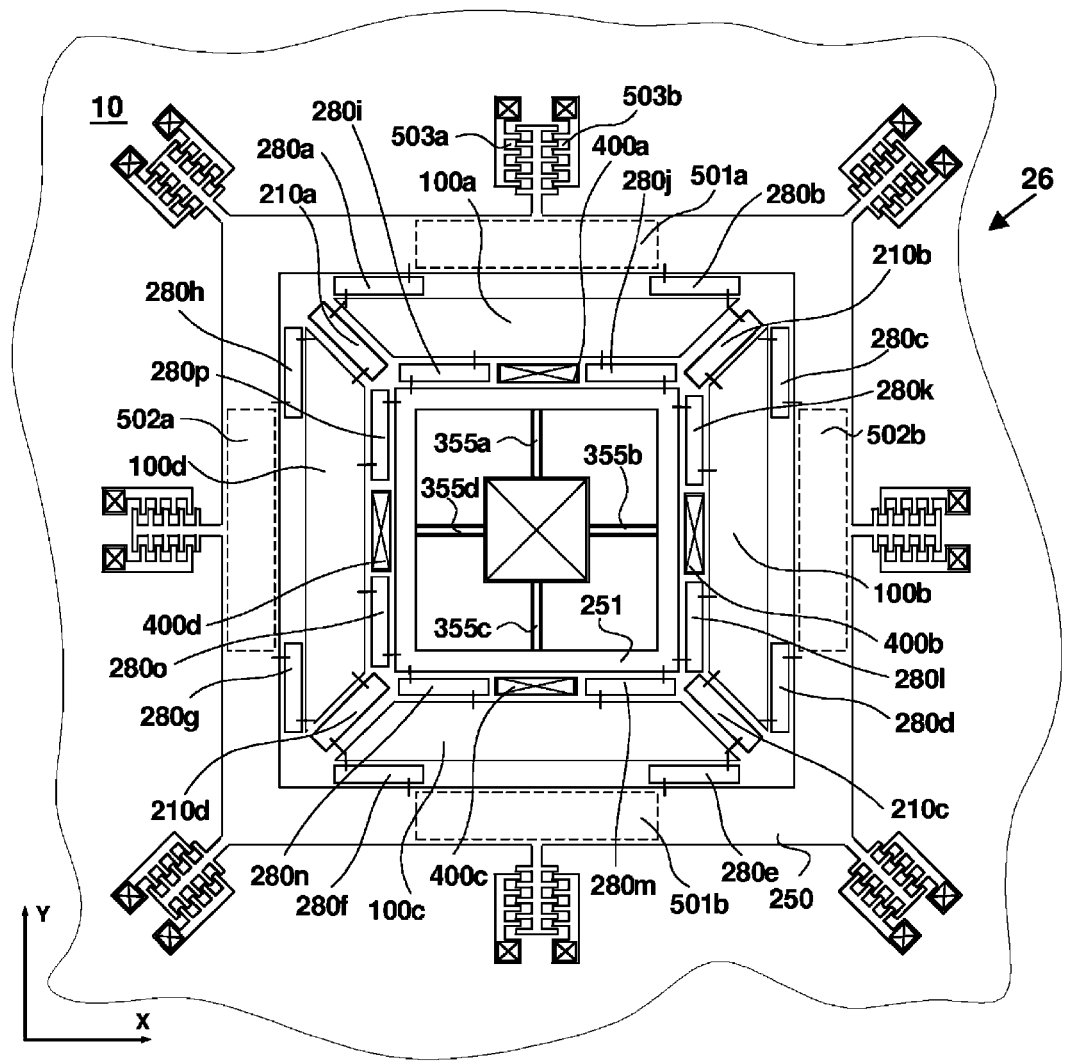
FIG. 8 is a top plan view of another embodiment of the angular rate sensor of the present invention, a modification of the embodiment of FIG. 5.

Referring to FIG. 8, another embodiment 26 of the angular rate sensor of the present invention is shown, a modification of the embodiment of FIG. 5. Anchoring linkages of FIG. 5 are replaced by an inner frame 251. The inner frame 251 is flexibly coupled to the base 10 through coupling linkage 355a-d. Coupling linkages 355a-d have similar stiffness properties as coupling linkage 350 from FIGS. 5 and 6a. Masses 100a-d are flexibly coupled to the inner frame through frame flexures 280i-p. The actuators 400a-d are attached directly to the masses 100a-d and may drive the masses 100a-d into motion. Functionality of the portion of the linkage 210a-d, the frame 250, frame flexures 280a-h and transducers 501-503 are similar to that of the embodiment shown in FIG. 5.

Figure 9:
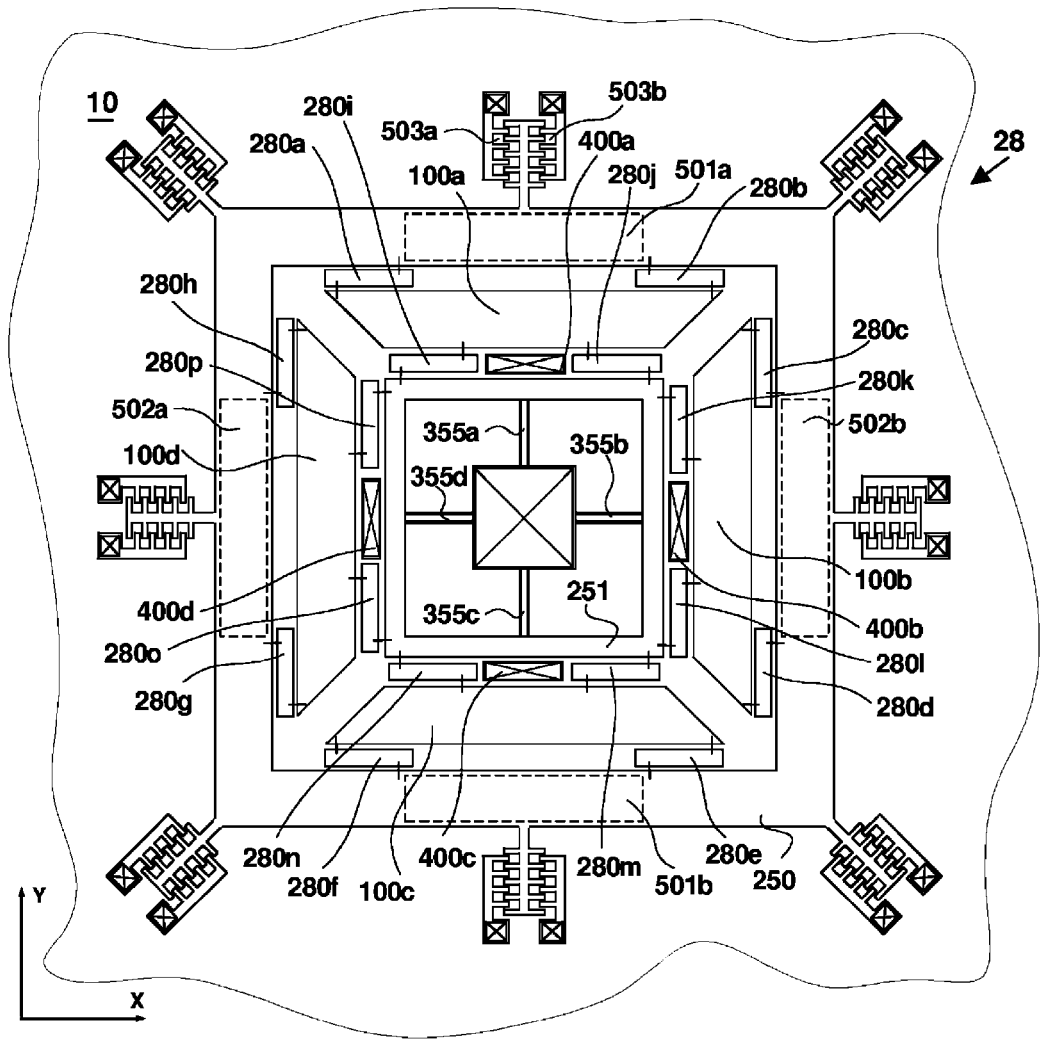
FIG. 9 is a top plan view of another embodiment of the angular rate sensor of the present invention, a modification of the embodiment of FIG. 8.

Referring to FIG. 9, another embodiment 28 of the angular rate sensor of the present invention is shown, a modification of the embodiment from FIG. 8. Relative to the embodiment shown in FIG. 8, the linkage portions 210a-d is removed. The extension mode is a resonant mode of the structure and by driving the masses using the actuator 400a-d, masses may be set in motion along the shape of the extension mode.

Figure 10:
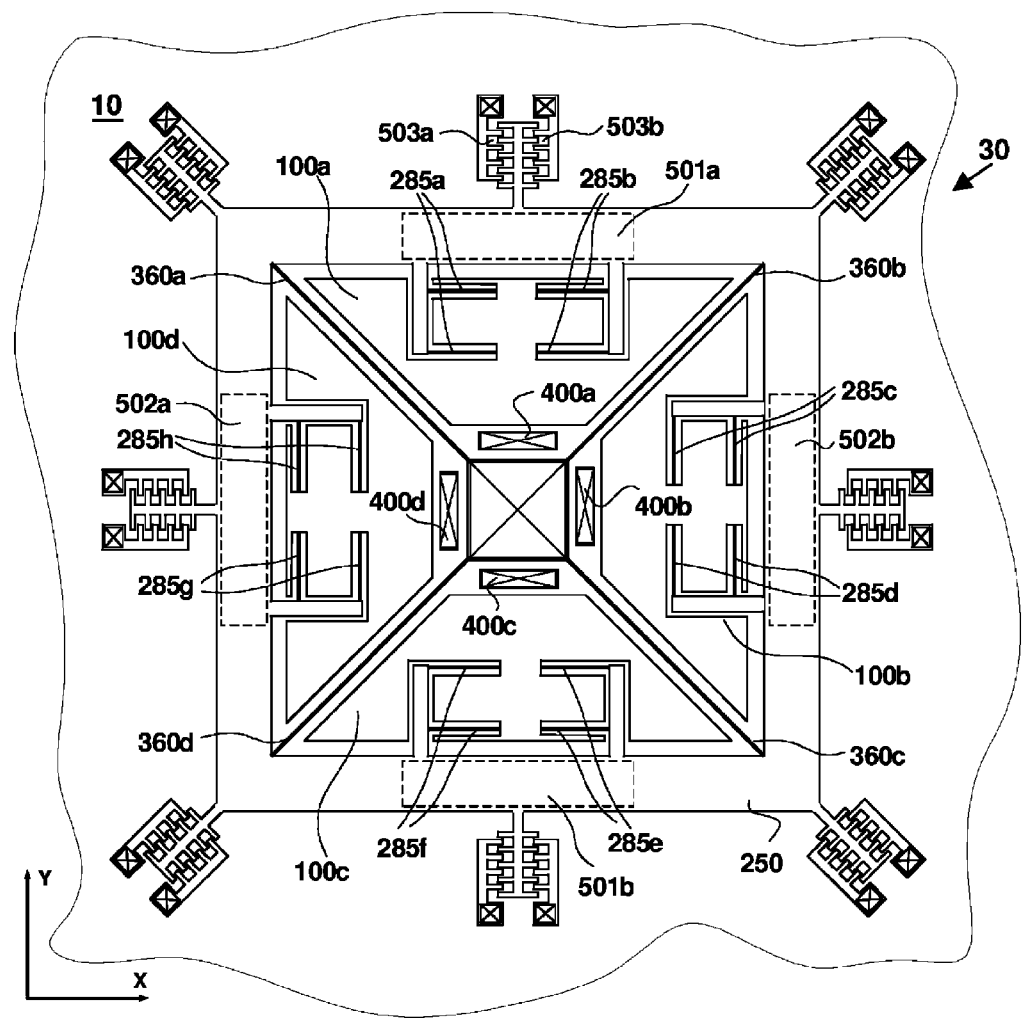
FIG. 10 is a top plan view of another embodiment of the angular rate sensor of the present invention.

Referring to FIG. 10, another embodiment 30 of the angular rate sensor of the present invention is shown. The masses 100a-d are flexibly coupled to the frame 250 through frame flexures 285a-h. The frame 250 is flexibly coupled to the base 10 through coupling springs 360a-d. The masses 100a-d may be set in motion by a set of actuators 400a-d. The frame flexures 285a-d ensure that the masses 100a-d are allowed to move substantially along the axis radiating from the center of mass of the masses 100a-d. The frame flexures 285a-d ensures that the masses 100a-d are restricted to move out-of plane and are restricted to move around the axis normal to the base and relative to the frame 250. Coupling flexures 360a-d allow the frame 250 and the masses 100a-d to rotate about the X axis. Coupling flexures 360a-d allow the frame 250 and the masses 100a-d to rotate about the Y axis. Coupling flexures 360a-d allow the frame 250 and the masses 100a-d to rotate about the Z axis. The extension mode is a resonant mode of the structure and by driving the masses by the actuator 400a-d masses may be set in motion conforming to the shape of the extension mode.

Figure 11:
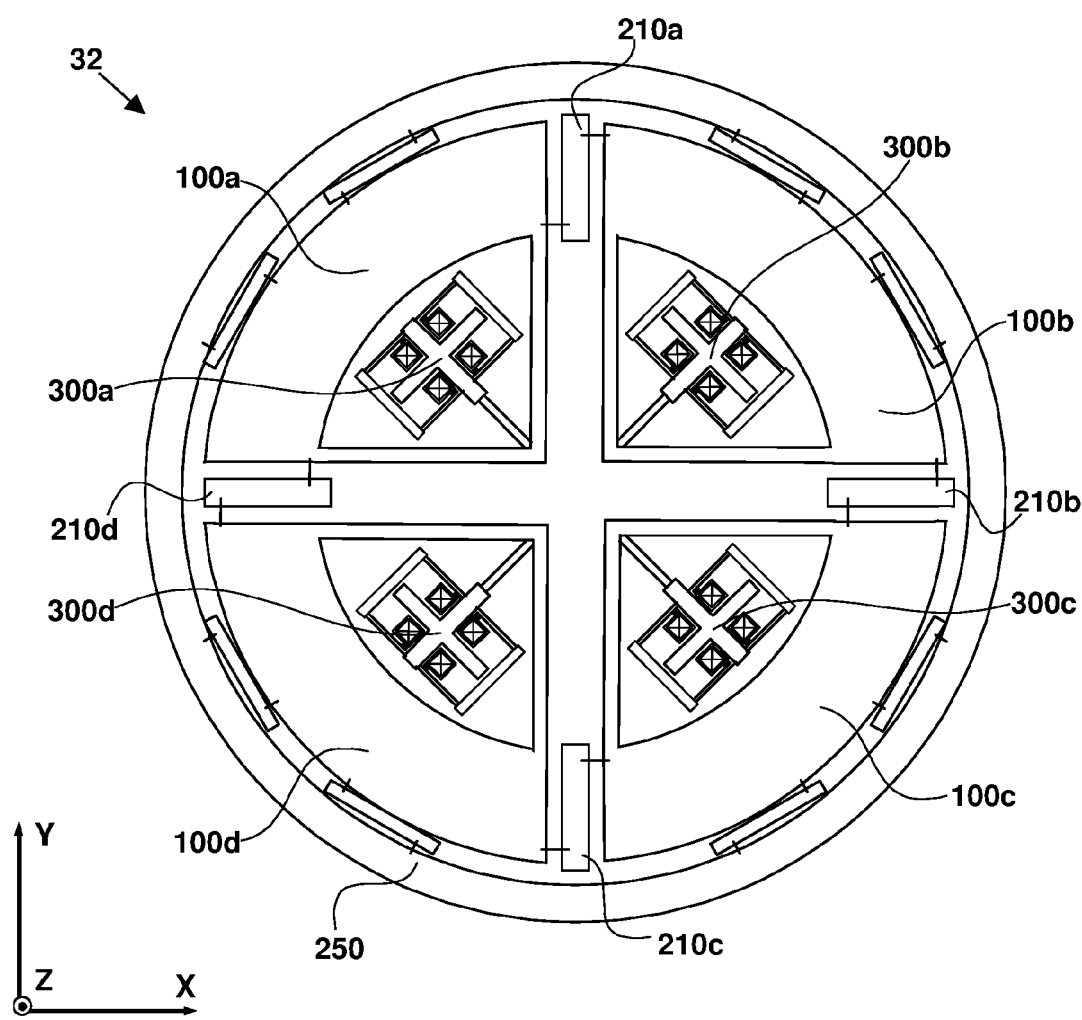
FIG. 11 is a top plan view of another embodiment of the angular rate sensor of the present invention.

FIG. 11 is a top plan view of another embodiment 32 of the angular rate sensor of the present invention. In this embodiment, the shape of the rate sensor when viewed from a top view down on the mass plane is substantially circular. Other shapes of masses and linkages can be used in the sensor in other embodiments. The operation and components of angular rate sensor 32 are substantially similar to that sensor 24 described above.

Operation

The angular rate sensor of the present invention senses angular velocity about one or more sensing axes. FIGS. 12a, 12b, 13a, 13b, 14a and 14c illustrate the operation of the angular rate sensor for different input rotation axes.

Figures 12A, 12B:
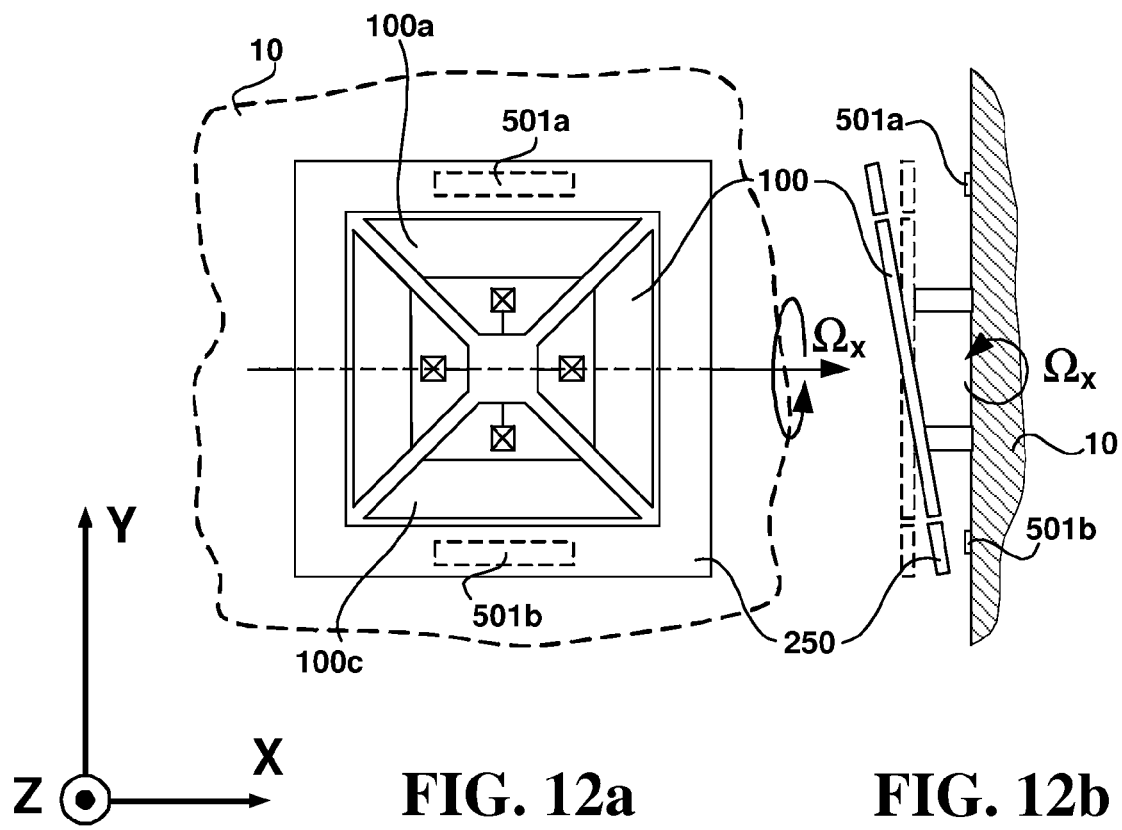
FIGS. 12a and 12b are top plan and side elevational views illustrating sensing operation of an angular rate sensor of the present invention when the input axis is the X axis.

FIGS. 12a and 12b illustrate the sensing operation when the input axis is the X axis, where FIG. 12a is a top plan view and FIG. 12b is a side elevational view. To perform the sensing operation, actuator 400 is controlled to set the motion of masses 100 such that the masses oscillate in extension mode substantially at the known resonant frequency of the moving mechanical structure in the extension mode. Referring to FIGS. 12a-b and FIG. 5, if the angular rate sensor (e.g., base 10) experiences a rate of rotation around the X axis, e.g. an input rotation $\Omega x$ rotates the angular rate sensor, then a Coriolis force will act on masses 100a and 100c in opposite directions along the axis normal to the mass plane at the frequency of the extension mode. Since the linkage 200 is stiff in the directions normal to the mass plane, resulting Coriolis forces will cause masses 100 together with the frame 250 to rotate around the X axis. The transducer 501a-b differentially senses motion of the frame 250.

Figure 13A:
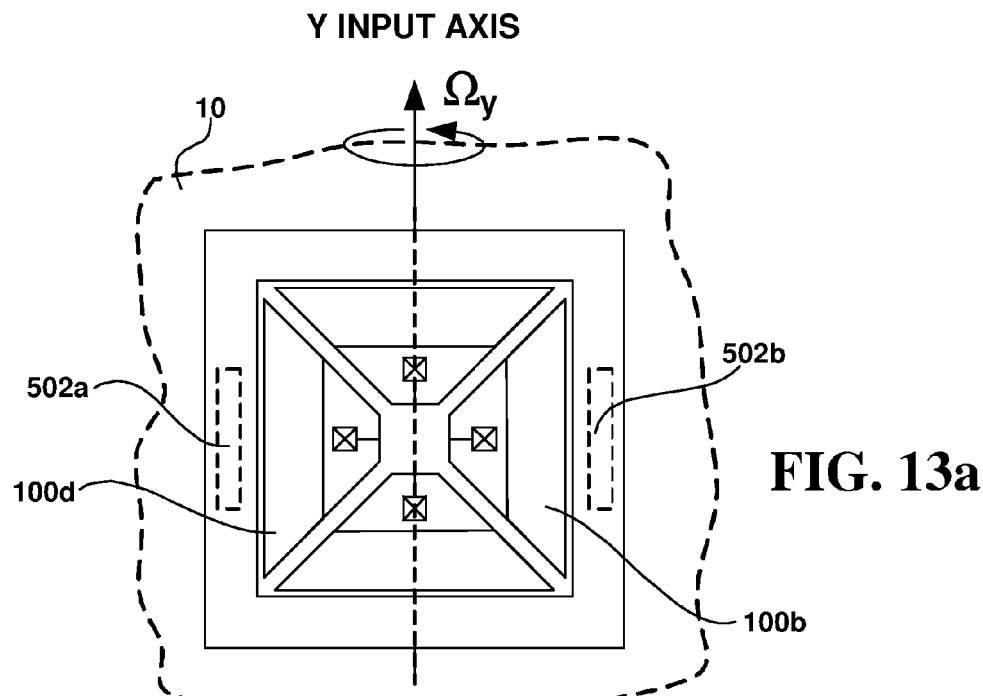
FIGS. 13a and 13b are top plan and side elevational views illustrating sensing operation of an angular rate sensor of the present invention when the input axis is the Y axis.
Figure 13B:
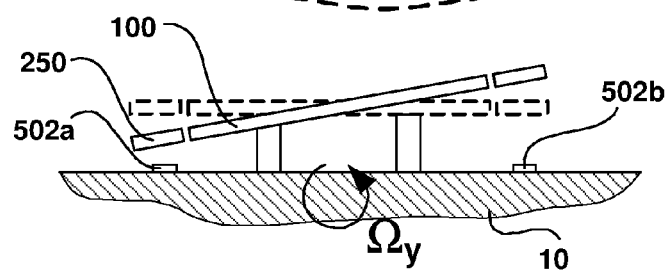

FIGS. 13a and 13b illustrate the sensing operation when the input axis is the Y axis, where FIG. 13a is a top plan view and FIG. 13b is a side elevational view. Referring to FIGS. 13a-b and FIG. 5, if the angular rate sensor (e.g., base 10) experiences a rate of rotation around the Y axis based on an input rotation $\Omega y$, then a Coriolis force will act on masses 100b and 100d in opposite directions along the axis normal to the mass plane at the frequency of the extension mode. Since the linkage 200 is stiff in the directions normal to the mass plane, resulting Coriolis forces will cause masses 100 together with the frame 250 to rotate around the Y axis. The transducer 502a-b differentially senses motion of the frame 250.

Figure 14A:
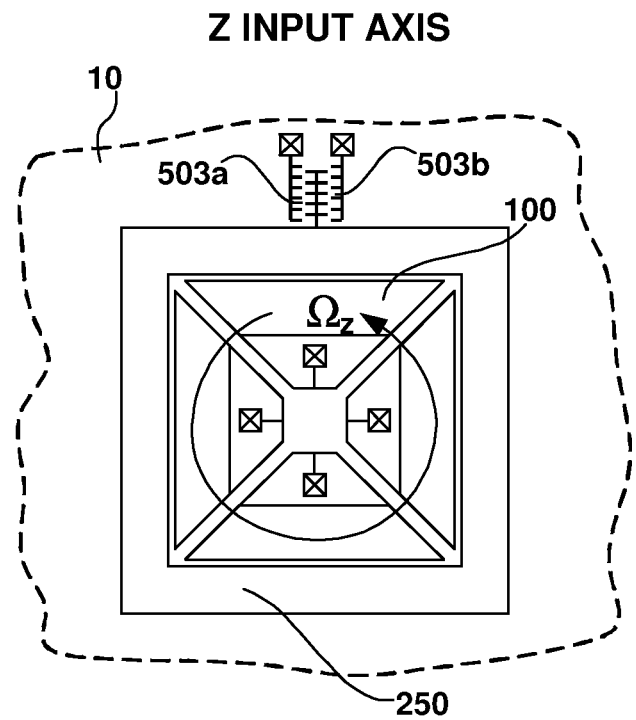
FIGS. 14a and 14b are top plan and side elevational views illustrating sensing operation of an angular rate sensor of the present invention when the input axis is the Z axis.
Figure 14B:
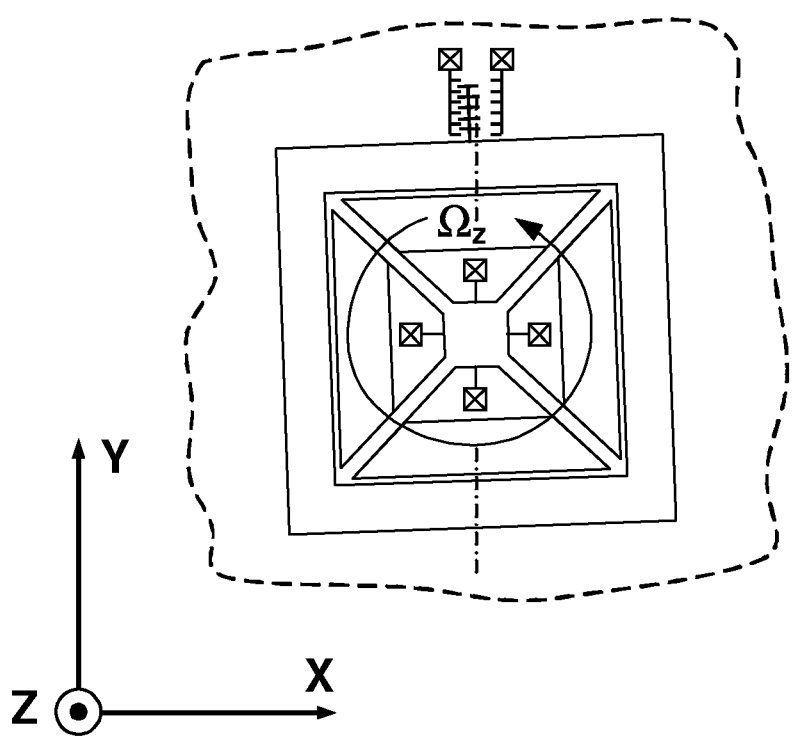

FIGS. 14a and 14b illustrate top plan views of the angular rate sensor to illustrate the sensing operation when the input axis is the Z axis. Referring to FIGS. 14a-b and FIG. 5, if the angular rate sensor (e.g., base 10) experiences a rate of rotation around the Z axis based on an input rotation, then a Coriolis force will act on masses 100a-d such that generated torque is normal to the mass plane at the frequency of the extension mode. Since the linkage 200 is stiff in the directions normal to the mass plane, resulting Coriolis forces will cause masses 100 together with the frame 250 to rotate around the Z axis. The transducer 503a-b differentially senses motion of the frame 250. FIG. 14b shows an example of a result after the frame 250 and masses 100 have rotated counterclockwise about the Z axis, as sensed by the transducer 503a-b.

Other embodiments of the angular rate sensor can perform additional sensing for other types of external stresses besides the Coriolis force. For example, input forces can be provided such as angular acceleration, which results in measuring acceleration instead of (or in addition to) the Coriolis forces as measured in the embodiments described above. Components to receive and sense such angular acceleration forces are known to those of skill in the art.

Some embodiments of the angular rate sensor of the present invention can be fabricated as a MEMS device. An important process step of fabrication of a low cost MEMS device is the integration of mechanical parts with the electronics. To address this need, a "Nasiri-Fabrication" platform may be utilized which is described for example in U.S. Pat. No. 7,104,129, entitled "Vertically Integrated MEMS Structure with Electronics in a Hermetically Sealed Cavity", assigned to the assignee of this application and incorporated herein by reference in its entirety. This fabrication process makes use of bulk micromachining and readily allows for the wafer level integration of the MEMS substrate and the electronics (ASIC) substrate. In addition to integration, this method encapsulates the mechanical parts in a low pressure hermetically sealed chamber that protects the MEMS device against adverse effect of environment such as humidity.

The basic steps of Nasiri-fabrication are shown in FIGS. 15A-15H. A handle wafer 40 is etched to form cavities as shown in FIG. 15A and FIG. 15B. Oxide is then grown on the handle wafer 40. A handle wafer 40 and a device wafer 45 are then fusion bonded together as shown in FIG. 15C. The assembly comprising handle wafer 40 and the device wafer 45 is polished to achieve desired device thickness as shown in FIG. 15D. The device wafer 45 is then etched to form stand-offs 73 as shown in FIG. 15E. The stand-offs 73 are then covered by germanium 71 as shown in FIG. 15F. The device wafer 45 is then etched to form portions of MEMS device as shown in FIG. 15G. The MEMS device may be any of the embodiments of the disclosed angular rate sensor of the present invention comprising the masses 100, the linkage 200, the anchoring linkage 300, the actuator 400, and the lateral transducer 503, for example. Further, as shown in FIG. 15H, the handle and the device wafers are then eutectically bonded to the ASIC wafer 50 with exposed aluminum 72 at bonding points. The transducers 501 and 502 may be formed between aluminum deposited on ASIC wafer and MEMS device layer comprising proof masses 100 (or frame 250). The handle wafer 40, the device wafer 45 and the ASIC wafer 50 may form a base 10.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An angular rate sensor comprising:
   a base;
   at least three substantially planar masses disposed substantially in a plane parallel to and above the base, the at least three substantially planar masses move in an extension mode; wherein in the extension mode the at least three substantially planar masses move in the plane simultaneously away or simultaneously towards a point; wherein at least one of the at least three substantially planar masses moves along a different axis than the others of the at least three substantially planar masses; and
   an X-axis capacitive sensor including an electrode formed on the base; a Y-axis capacitive sensor including an electrode formed on the base; a Z-axis capacitive sensor including a moveable electrode attached to the at least one of the at least three substantially planar masses and a fixed electrode substantially parallel to the moveable electrode and in the plane; wherein the X-axis capacitive sensor, the Y-axis capacitive sensor, and the Z-axis capacitive sensor sense angular velocity of the angular rate sensor about three different input axes of the angular rate sensor.

2. The angular rate sensor of claim 1 further including at least one actuator, wherein the at least one actuator drives the at least three substantially planar masses in the extension mode.

3. The angular rate sensor of claim 2, wherein the point is a center of mass of the at least three substantially planar masses.

4. The angular rate sensor of claim 3, wherein the center of mass of the at least three substantially planar masses does not substantially move when the at least three substantially planar masses are moving in the extension mode.

5. The angular rate sensor of claim 2, which includes a capacitive sensor for sensing the motion of one the at least three substantially planar masses in the extension mode; wherein the at least one actuator drives the at least three substantially planar masses as a single-drive system having a single drive mode, in which only a single drive circuit is used to control the at least one actuator.

6. The angular rate sensor of claim 5 wherein the single drive circuit comprises a single pickup circuit coupled to the capacitive sensor, a phase shifter and a feedback circuit to provide a signal back to the actuator.

7. The angular rate sensor of claim 2, wherein the at least one actuator comprises an electrostatic actuator.

8. The angular rate sensor of claim 1, wherein the angular rate sensor includes at least three linkages which couple the at least three substantially planar masses such that each mass is flexibly coupled to two of the other substantially planar masses via two of the at least three linkages.

9. The angular rate sensor of claim 1, further comprising a frame parallel to the plane and flexibly coupled to the at least three substantially planar masses, wherein the at least three substantially planar masses are situated outside of the frame and are substantially coplanar within the plane.

10. The angular rate sensor of claim 1 wherein the extension mode is a resonant mode in which the three substantially planar masses are moved at a resonant frequency.

11. The angular rate sensor of claim 1, which includes a capacitive sensor for sensing the motion of at least one of the at least three substantially planar masses in the extension mode.

12. The angular rate sensor of claim 1 wherein at least one of the at least three substantially planar masses is flexibly coupled to the base through an associated anchoring linkage.

13. The angular rate sensor of claim 12, wherein the associated anchoring linkage further comprises: an actuator mass suspended to the base via an anchoring flexure; and a coupling flexure flexibly coupling the at least one of the at least three substantially planar masses to the actuator mass.

14. The angular rate sensor of claim 13 includes an electrostatic actuator; wherein the electrostatic actuator includes an electrode on the actuator mass and an electrode fixed to the base.

15. The angular rate sensor of claim 13, wherein the anchoring flexure is substantially compliant to motion in the extension mode.

16. The angular rate sensor of claim 13 wherein, the coupling flexure is substantially stiff to translation in the extension mode.

17. The angular rate sensor of claim 1, further comprising a cover coupled to the base and enclosing the at least three substantially planar masses, the X-axis capacitive sensor, the Y-axis capacitive sensor, and the Z-axis capacitive sensor, wherein the cover is hermetically sealed to the base.

18. The angular rate sensor of claim 1 further comprising a frame substantially parallel to the plane and flexibly coupled to the at least three substantially planar masses.

19. The angular rate sensor of claim 18 wherein the at least three substantially planar masses are situated outside of the frame and are substantially coplanar within the plane.

20. The angular rate sensor of claim 18 wherein the at least three substantially planar masses are situated inside of the frame and are substantially coplanar within the plane.

21. The angular rate sensor of claim 18, wherein the X-axis capacitive sensor and the Y-axis capacitive sensor include a moveable electrode attached to the frame.

22. The angular rate sensor of claim 1, wherein the X-axis capacitive sensor includes a moveable electrode attached to the at least one of the at least three substantially planar masses and the Y-axis capacitive sensor includes a moveable electrode attached to the at least one of the at least three substantially planar masses.

23. An angular rate sensor comprising:
   a base;
   at least three substantially planar masses disposed substantially in a plane parallel to and above the base, the at least three substantially planar masses move in an extension mode;
   wherein in the extension mode the at least three substantially planar masses move in the plane simultaneously away or simultaneously towards a center of mass of the at least three substantially planar masses;

wherein the center of mass of the at least three substantially planar masses does not substantially move when the at least three substantially planar masses are moving in the extension mode, wherein at least two of the at least three substantially planar masses move along a different axis than the others of the at least three substantially planar masses;

an X-axis capacitive sensor including an electrode formed on the base;

a Y-axis capacitive sensor including an electrode formed on the base;

a Z-axis capacitive sensor including a moveable electrode attached to the at least one of the at least three substantially planar masses and a fixed electrode substantially parallel to the moveable electrode and in the plane;

at least one electrostatic actuator that drives the at least three substantially planar masses in the extension mode;

at least three linkages which couple the at least three masses such that each mass is flexibly coupled to two of the other masses via two of the at least three linkages;

wherein the at least three linkages cause the at least three masses to move in the extension mode; and a frame parallel to the plane and flexibly coupled to the at least three substantially planar masses, the at least three substantially planar masses surrounding an outside of the frame within the plane;

wherein at least one of the at least three substantially planar masses is flexibly coupled to the base through an associated anchoring linkage; wherein the associated anchoring linkage further comprises an actuator mass suspended to the base via an anchoring flexure; and a coupling flexure flexibly coupling the at least one of the at least three substantially planar masses to the actuator mass; wherein the at least one electrostatic actuator includes an electrode coupled to the actuator mass and an electrode fixed to the base;

wherein the anchoring flexure is substantially compliant to motion in the extension mode;

wherein the coupling flexure is substantially stiff to translation in the extension mode.

24. The angular rate sensor of claim 23, wherein the extension mode is a resonant mode in which the at least three substantially planar masses are moved at a resonant frequency.

25. The angular rate sensor of claim 23, wherein the at least one electrostatic actuator drives the at least three substantially planar masses as a single-drive system having a single drive mode, in which only a single drive circuit is used to control the at least one electrostatic actuator.

26. The angular rate sensor of claim 23, a cover coupled to the base and enclosing the at least three substantially planar masses, the X-axis capacitive sensor, the Y-axis capacitive sensor, and the Z-axis capacitive sensor, wherein the cover is hermetically sealed to the base; wherein the X-axis capacitive sensor, the Y-axis capacitive sensor, and the Z-axis capacitive sensor sense angular velocity of the angular rate sensor about three different input axes of the angular rate sensor.

27. A method for utilizing an angular rate sensor comprising:

moving at least three substantially planar masses, disposed substantially in a plane parallel to and above a base, in an extension mode;

wherein in the extension mode the at least three substantially planar masses move in the plane simultaneously away or simultaneously towards a point wherein at least one of the at least three substantially planar masses move along a different axis than the others of the at least three substantially planar masses;

providing an X-axis capacitive sensor including an electrode formed on the base;

providing a Y-axis capacitive sensor including an electrode formed on the base; and providing a Z-axis capacitive sensor including a moveable electrode attached to the at least one of the at least three substantially planar masses and a fixed electrode substantially parallel to the moveable electrode and in the plane; wherein the X-axis capacitive sensor, the Y-axis capacitive sensor, and the Z-axis capacitive sensor sense angular velocity of the angular rate sensor about three different input axes of the angular rate sensor.

* * * * *